(12) United States Patent
Gkinosatis

(10) Patent No.: US 10,486,403 B2
(45) Date of Patent: Nov. 26, 2019

(54) OVENABLE THERMOFORMABLE FILM

(71) Applicant: FLEXOPACK S.A., Koropi (GR)

(72) Inventor: Dimitris Gkinosatis, Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 15/717,014

(22) Filed: Sep. 27, 2017

(65) Prior Publication Data
US 2018/0086039 A1 Mar. 29, 2018

(30) Foreign Application Priority Data

Sep. 27, 2016 (EP) .................................. 16190912

(51) Int. Cl.
| | |
|---|---|
| B32B 27/36 | (2006.01) |
| B32B 7/02 | (2019.01) |
| B32B 27/28 | (2006.01) |
| B32B 27/08 | (2006.01) |
| B32B 27/34 | (2006.01) |
| C08L 67/02 | (2006.01) |
| C08L 77/02 | (2006.01) |
| C08G 69/26 | (2006.01) |
| C08G 69/40 | (2006.01) |

(52) U.S. Cl.
CPC ............ *B32B 27/36* (2013.01); *B32B 7/02* (2013.01); *B32B 27/08* (2013.01); *B32B 27/281* (2013.01); *B32B 27/34* (2013.01); *C08L 67/02* (2013.01); *C08L 77/02* (2013.01); *B32B 2307/30* (2013.01); *B32B 2307/306* (2013.01); *B32B 2307/31* (2013.01); *B32B 2439/70* (2013.01); *C08G 69/265* (2013.01); *C08G 69/40* (2013.01)

(58) Field of Classification Search
None
See application file for complete search history.

(56) References Cited

U.S. PATENT DOCUMENTS

| | | | |
|---|---|---|---|
| 2004/0043233 A1* | 3/2004 | Berrier | B32B 27/34 428/474.7 |
| 2009/0080812 A1* | 3/2009 | Schmal | B32B 27/34 383/109 |
| 2009/0081417 A1* | 3/2009 | Schmal | B29C 51/002 428/192 |
| 2009/0130276 A1* | 5/2009 | Voisin | B32B 27/08 426/415 |
| 2014/0017490 A1* | 1/2014 | Forloni | B32B 27/08 428/354 |
| 2014/0183084 A1* | 7/2014 | Brebion | B32B 27/34 206/524.2 |

* cited by examiner

Primary Examiner — Chinessa T. Golden
(74) Attorney, Agent, or Firm — Millen White Zelano and Branigan, PC; Csaba Henter

(57) ABSTRACT

The invention relates to a thermoformable film able to withstand cooking conditions in conventional and microwave ovens. The film comprises of 5-95% per weight polyamide, 5-95% per weight polyester and optionally up to 10% per weight polyolefin polymer 1, where the highest melting point of the polyamides used is less than 245° C.

9 Claims, No Drawings

OVENABLE THERMOFORMABLE FILM

The invention relates to a thermoformable film able to withstand cooking conditions in conventional and microwave ovens. The film comprises of 5-95% per weight polyamide, 5-95% per weight polyester and optionally up to 10% per weight polyolefin polymer wherein the melting point of the polyamide is less than 245° C.

BACKGROUND

Plastic containers have been increasingly used in packaging applications, such as "food packaging", and in particular for cook-in convenience food. As an example, ready-prepared ovenable meals can be provided which can be warmed in a conventional oven. Today, busy customers are demanding higher quality products, easier-to-use packaging and faster reheating options to achieve more flexibility in the kitchen. The ability to cook food in the conventional oven is a practical necessity.

Thermoforming is a known packaging process in which a container (e.g. a tray) is formed by a plastic film in a mold by application of vacuum, air pressure or a plug under increased temperature. Then, food is placed in the container and air is drawn from the package prior to sealing it close. Such packaging has comparable storage and preservation characteristics to shrinkable packaging Thermoforming process in general involves two packaging films:
1. The top lid film which seals under vacuum to the bottom film.
2. The bottom thermoformable film which is formed into a tray during the first step of the packing process and where-into the food is placed prior to the vacuum-seal step.

Cook-in packaging is packaging in which a food product is packed non-cooked or precooked for a consumer. The consumer then warms or cooks the food without removing the package.

The cook-in concept is particularly desired since it avoids the need for the consumer to handle raw meat or fish, which is often disagreeable. Moreover, the handling of raw meat is a growing concern from a food safety perspective while a pre-packed cook in food package reduces the risk of contamination.

In case the cook-in is done in a conventional oven, the films or trays used must combine the following features:
1. Enough thermal resistance not to disintegrate in the oven for a cooking process of 200° C. lasting 1 hour.
2. The sealing of the top lid film to the bottom thermoformable film must be strong enough to avoid any leakers or unsealed areas which could be dangerous for the food integrity.
3. The oxygen barrier of both top and bottom (or tray) materials are high enough to protect the film from oxygen ingress which is detrimental for the shelf life of the product.

In general, common films used in thermoforming are multilayers incorporating different layers of polyamides, polyolefins (e.g. polyethylene or polypropylene) and optionally higher barrier materials such as EVOH. While these combinations of materials are very well performing in conventional applications, they do not have sufficient heat resistance to withstand conventional oven temperatures like 200° C. They often disintegrate during this kind of cooking.

In the prior art several approaches have been used to increase the thermal stability of the thermoforming films. U.S. Pat. No. 7,504,158 describes a film comprising mostly polyamide. While this film is heat resistant enough, its sealing behavior in the thermoforming machine is not sufficient and unstable. Same deficiencies stand with the films described in US 2012/0213896.

In the market, there are films comprising polyamide 66 that are used in similar applications. Polyamide 66 has a very high melting point at about 255° C. and it is not easy to extrude in conventional extrusion lines. It is also very stiff. The present application is able to offer improved performance with polyamides having a melting point up to 240° C.

SUMMARY OF THE INVENTION

The present invention provides a film which comprises of 5-95% per weight polyamide, 5-95% per weight polyester and optionally up to 10% per weight polyolefin polymer wherein the melting point of the polyamide is less than 245° C.

The present invention further provides a process of cook-in comprising the following steps:
thermoforming a bottom film with the characteristics as described above
sealing it to a top film with the characteristics as described above under vacuum
cooking the pack produced in oven under 200° C. for at least one hour Definitions In this application the following definitions are used:

The term "film" refers to a flat or tubular flexible structure of thermoplastic material.

As used herein the term "bottom film" refers to a film which is converted to a formed pouch during thermoforming process.

As used herein the term "top lidding film" refers to a film which seals to the bottom film during the thermoforming operation. It is also called "top film".

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither the outer nor the inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types "homopolymer" and "copolymer".

As used herein the term "polyolefin" includes all the products produced by polymerization of olefins. Polyethylene and polypropylene homo and copolymers are the most common ones.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra-low density polyethylene (ULDPE), metallocene catalyzed polymers and polyethylene plastomers and elastomers.

In these cases the alpha olefin can be propene, butene, hexene, octene etc. as known in the art.

In the scope of the present patent the term "copolymer" may include the maleic anhydride modified polymers, often used as adhesive materials.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%. Abbreviation used is EMA.

As used herein the phrase "ethylene vinyl acetate copolymer" refers to copolymers of ethylene and vinyl acetate. Abbreviation used is EVA.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" includes crystalline polymers, amorphous polymers and polyester elastomers. Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks. Other polyester materials are also included in the above definition.

As used herein the term "polybutylene" refers to butene-1 homopolymers and copolymers. Useful copolymers comprise ethylene mer units. The ethylene content should be generally less than 50%.

DETAILED DESCRIPTION OF THE INVENTION

The present invention teaches a film which comprises of 5-95% per weight polyamide, 5-95% per weight polyester and optionally up to 10% per weight polyolefin polymer wherein the highest melting point of the polyamides used is less than 240° C.

Preferably, the film comprises 20-80% by weight polyamide, 20-80% by weight polyester and optionally up to 10% by weight polyolefin copolymer with the highest polyamide melting point to be less than 240° C.

In a further preferred version, the film is not biaxially oriented from solid state (e.g. double bubble or tenter frame produced) but produced from a hot blown film line, e.g. oriented from melt state.

In a further preferred version, the sealing layer of the film comprises a polyester.

In a further preferred version, the sealing layer of the film comprises a polyester copolymer with a glass transition temperature (measured as per ASTM D 1525) of less than 85° C., preferably less than 80° C.

In a preferred version the film has the following construction:
POLYAMIDE (outer layer)/TIE/POLYESTER (inner sealing layer).

In a further preferred version the film has the following construction:
POLYAMIDE (outer layer)/POLYAMIDE (next layer)/TIE/POLYESTER (next layer)/POLYESTER (heat sealing layer).

In a 7 layer construction used commonly in the market the construction could be as follows:
POLYAMIDE/POLYAMIDE/POLYAMIDE/TIE/POLYESTER/POLYESTER/POLYESTER
or
POLYAMIDE/POLYAMIDE/TIE/POLYESTER/POLYESTER/POLYESTER/POLYESTER
or any other possible construction, but always putting a tie layer between the polyester and polyamide layers, wherein the different polyamide and polyester layers could comprise the same or different materials.

In the above the "polyamide" or "polyester" layers may include the option that other materials are present, but the major per weight portion (more than 50%) is polyamide and polyester, respectively.

Film Construction

Preferably the film comprises 5 to 15 layers, more preferably 7 to 12 layers.

Inner Sealing Layer

The inner sealing layer comprises preferably a copolyester with a glass transition temperature of less than 85° C., more preferably less than 80° C., even more preferably less than 77° C.

The inherent viscosity of the copolyester is preferably less than 0.85, more preferably less than 0.75, more preferably less than 0.72.). The inherent viscosity is measured as per method EMN-A-AC-G-V-1.

Polyester Layers

The other polyester layers may include any other thermoplastic polyester known in the art.

PET is preferred due to high clarity.

Tie Layer(s)

The tie layer(s) may include any of the below options
a blend of polyamide with a polyester
a blend of polyamide with an elastomer
a blend of polyester with an elastomer a blend of polyamide with polyolefin copolymer
a blend of polyester with polyolefin copolymer Suitable elastomers for the above blends are polyamide elastomers, polyester elastomers and styrenic elastomers. Suitable polyolefin copolymers are maleic anhydride modified or ionomers.

Elastomers or polyolefin copolymers with higher polarity are preferred due to possibility to mix better with polyamide or polyester.

In case polyolefin materials are used, the maximum weight percentage should be 10%. Above this level, the heat stability of the material will deteriorate. A value less than 5% is even preferred.

Polyamide Layers

The polyamide layers may include any known polyamide suitable for blown film extrusion. Polyamide 6 is preferred as it combines high heat stability and good thermoformability.

Preferably, at least one polyamide with a melting point of at least 200° C. is present in the structure. Such polyamides are polyamide 6, 612, 610, certain polyamide copolymers of 6/66 construction, MXD copolymers and 66/610 copolymers.

In the invention the maximum melting point of the polyamides must be 245° C. Polyamides with higher melting point are very stiff, more difficult to thermoform and more difficult to extrude.

The presence of amorphous polyamides in the structure is also possible. A preferred version is 6I/6T copolymer with a glass transition temperature of about 125° C.

Outer Layer

The outer layer may be a polyester or polyamide layer as described above. Preferably it is a polyamide layer.

EVOH Layer

In the structure there is a possibility that a layer comprises EVOH. In order to keep the thermal stability high it is preferable to use an EVOH with mol equal or less to 32% as well known in the art.

Crosslinking

In order to improve certain properties, the film may be crosslinked.

The crosslinking may be done by various methods but the preferred are e-beam, gamma radiation and peroxides.

Container

The container can be a film as described above thermoformed in line and sealed to a film of the construction above used as top lidding film.

In one preferable version of the invention, the bottom has a thickness of 40 to 300 microns and the top film of 30 to 200 microns.

In a further preferable version, this tray or sheet comprises polyester, preferably CPET.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 16190912.2, filed Sep. 27, 2016, are incorporated by reference herein.

EXAMPLES

Example 1

From a commercial hot blown film line we produced a film with the following layers:

| | |
|---|---|
| Outer layer | thickness 35 microns |
| Polyamide layer | thickness 10 microns |
| Tie layer 1 | thickness 30 microns |
| Polyester layer | thickness 10 microns |
| Inner layer | thickness 35 microns |

Wherein
the outer layer is a blend of 80% by weight polyamide 6 (ULTRAMID B40LN from BASF) and 20% by weight amorphous polyamide (GRIVORY G21 from EMS);
the polyamide layer is the same as the outer layer;
the tie layer comprises 90% by weight of polyamide 6 and 10% by weight of polyamide elastomer PEBAX 1878;
the polyester layer comprises a blend of 90% by weight Cumastretch PET and 10% by weight of polyester elastomer Arnitel EM630;
the inner layer comprises the Eastman material GP001; and
the film has a total thickness of 120 microns.

Thermoforming Test

The film has been tested as per thermoformability in a film thermoforming machine with excellent thermoforming results.

Example 2

From a commercial hot blown film line we produced a film with the following layers:

| | |
|---|---|
| Outer layer | thickness 30 microns |
| Polyamide layer | thickness 7 microns |
| Tie layer 1 | thickness 20 microns |
| Polyester layer | thickness 8 microns |
| Inner layer | thickness 20 microns |

Wherein the materials used are the same as in Example 1.

Thermoforming Test

The film was used as top lidding film in thermoforming test.

Film of example 1 was used to seal to film 2 in order to make the final vacuumized pack.

Both the performance of film of Example 1 as bottom film and film of Example 2 as top film were good. Sealing was also good. The packs then were submitted to cooking test as below.

Cook-In Test

The above pack was tested in a house oven putting the set temperature at 200° C. in normal convection mode (no forced air).

After 1.5 hour cooking the packs were opened and tested as per film degradation, cooking quality and palatability.

There was no visible thermal degradation of the pack.
The cooking quality was very good.
The palatability was very good.

Comparative Example

Two comparative combinations were used.
Both were according to examples 1 and 2 but the tie layer, polyester layer and inner sealing layer were replaced by a blend of 80% by weight copolyamide Ultramid C40L of BASF and 20% by weight amorphous polyamide Grivory G21 from EMS.

Firstly it was noticed that the processing was more difficult. Bubble stability was much worse and a challenge to the line operators.

Thermoforming test was also done. Thermoforming itself was good but sealing of the top to the bottom film was not stable.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A thermoformable and ovenable film which comprises: 5-95% per weight polyimide and 5-95% per weight polyester, where the highest melting point of the polyamides used is less than 245° C., and where the film comprises the following layers in the following order:
   an outer layer comprising a blend of a polyamide 6 and an amorphous polyamide;
   a layer comprising a polyamide;
   a tie layer comprising a blend of a polyamide 6 and an elastomer;
   a layer comprising a polyester; and
   an inner sealing layer comprising a glycol-modified polyethylene terephthalate (PETG).

2. The film according to claim 1, wherein the film comprises 20-80% per weight polyamide and 20-80% per weight polyester.

3. The film according to claim 1, wherein the film is produced by a hot blown film process.

4. The film according to claim 1, wherein the film comprises at least one polyamide with melting point of more than 200° C.

5. The film according to claim 1, wherein the film comprises at least one polyester with a glass transition temperature of less than 85° C.

6. The film according to claim 1, wherein the layer comprising a polyamide comprises a blend of a polyamide 6 and an amorphous polyamide.

7. The film according to claim 1, wherein:
   the outer layer has a thickness of 30-35 microns;
   the layer comprising a polyamide has a thickness of 7-10 microns;
   the tie layer has a thickness of 20-30 microns;
   the layer comprising a polyester has a thickness of 8-10 microns; and
   the inner sealing layer has a thickness of 20-35 microns.

8. The film according to claim 1, wherein the elastomer in the tie layer is a polyamide elastomer, polyester elastomer or styrenic elastomer.

9. The film according to claim 1, wherein the layer comprising a polyester comprises a polyethylene terephthalate polyester.

* * * * *